HOWARD D. LINK
HAROLD C. BRIDWELL
DAVID S. ROWLEY
INVENTORS.
By Bernard Kriegel
ATTORNEY.

RETRACTABLE DRILL BITS

Filed Sept. 30, 1966

HOWARD D. LINK
HAROLD C. BRIDWELL
DAVID S. ROWLEY
INVENTORS.

By Bernard Kriegel

ATTORNEY.

HOWARD D. LINK
HAROLD C. BRIDWELL
DAVID S. ROWLEY
INVENTORS.
By Bernard Kriegel
ATTORNEY.

HOWARD D. LINK
HAROLD C. BRIDWELL
DAVID S. ROWLEY
INVENTORS.
By Bernard Kriegel
ATTORNEY.

HOWARD D. LINK
HAROLD C. BRIDWELL
DAVID S. ROWLEY
INVENTORS.

By Bernard Kriegel
ATTORNEY.

April 8, 1969 H. D. LINK ET AL 3,437,159

RETRACTABLE DRILL BITS

Filed Sept. 30, 1966 Sheet 6 of 10

HOWARD D. LINK
HAROLD C. BRIDWELL
DAVID S. ROWLEY
INVENTORS.

By Bernard Kriegel
ATTORNEY.

HOWARD D. LINK
HAROLD C. BRIDWELL
DAVID S. ROWLEY
INVENTORS
By Bernard Kriegel
ATTORNEY.

HOWARD D. LINK
HAROLD C. BRIDWELL
DAVID S. ROWLEY
INVENTORS
By Bernard Kriegel
ATTORNEY.

HOWARD D. LINK
HAROLD C. BRIDWELL
DAVID S. ROWLEY
INVENTORS.
By Bernard Kriegel
ATTORNEY.

HOWARD D. LINK
HAROLD C. BRIDWELL
DAVID S. ROWLEY
INVENTORS.

By Bernard Kriegel
ATTORNEY.

3,437,159
RETRACTABLE DRILL BITS

Howard D. Link, Harold C. Bridwell, and David S. Rowley, Salt Lake City, Utah, assignors to Christensen Diamond Products Company, Salt Lake City, Utah, a corporation of Utah Filed Sept. 30, 1966, Ser. No. 583,263
Int. Cl. E21b 9/35
U.S. Cl. 175—260 24 Claims

ABSTRACT OF THE DISCLOSURE

A rotary well drill bit lowered through drill pipe with cutters in tandem array, the cutters being expanded outwardly and locked to the lower end of the drill pipe to drill the bottom of the well bore. The cutters can be pulled by a wire line device back into the drill pipe and elevated through the drill pipe to the drilling rig for replacement or inspection. The bit can include a core barrel apparatus for producing a core during drilling of the hole, the core apparatus being lowered and elevated through the drill pipe with the tandem cutters.

The present invention relates to rotary bits for drilling bore holes, and more particularly to rotary bits which are retrievable and replaceable by movement through a string of drill pipe extending to the drilling rig, obviating the need for withdrawing the drill pipe string from the bore hole each time the drill bit is to be removed for replacement or inspection.

In the rotary drilling of well bores, and similar bore holes, the usual practice is to secure a rotary drill bit to the lower end of a string of drill pipe and lower such pipe to the bottom of the bore hole for continued drilling of the hole. Dulling of each bit requires removal of the entire string of drill pipe to the drilling rig, removal of the dull bit, the attaching of another bit to the drill string, and relowering of the latter in the bore hole to its bottom. The necessity for "round tripping" the drill pipe for changing bits is a relatively slow and costly operation in view of the time consumed, the cost increasing as the depth of the hole increases and the string of drill pipe becomes longer. The cost of round tripping is quite considerable in offshore drilling of bore holes, in view of the very high hourly rate of operating a drilling platform, or a drilling vessel or barge floating in the ocean or other body of water.

It has been proposed to avoid the costly round tripping of the drill pipe for the purpose of changing drill bits by providing bits of the type that can be moved through the string of drill pipe, being latched in the lower portion of the latter for the performance of the rotary operation, and being released from the drill pipe when the drill bit is to be replaced. The prior devices have not been successful, since the drill bit cutters are relatively small, placing limitations on the diameter of the hole which they can drill effectively. This is particularly true where the minimum diameter of the passage through the drill pipe string is relatively small. These difficulties are enhanced when it is desired to employ a core bit and core barrel capable of passing through the drill string, and of forming and recovering a core of an appropriate diameter.

It is an object of the present invention to provide an improved rotary drill bit of the type capable of being lowered and removed through a string of drill pipe, or other drill string, and which overcomes the above-noted disadvantages.

Another object of the invention is to eliminate the need for slow round trips with the drill pipe to change the drill bits, thereby reducing considerably the time required for changing drill bits, with resultant major economies in drilling of the bore hole.

A further object of the invention is to provide an apparatus, which includes a coring mechanism and drill bit cutter members capable of being run together through a drill string and to be removed together through the drill string, allowing the drill bit cutters or members to be inspected each time the coring mechanism is withdrawn through the drill pipe string to the drilling rig.

An additional object of the invention is to provide a coring mechanism and drill bit members for cutting the core which are capable of being moved through the drill pipe and associated apparatus, such as a hollow shaft rotary turbine, that might be incorporated in the drill pipe string, and to remove the coring mechanism and drill bit members through the drill pipe and its associated devices, and yet be capable of producing and recovering a relatively large diameter core.

Yet another object of the invention is to provide a drill bit mechanism which embodies relatively large bit members moveable through the drill pipe, and capable of being positively locked in expanded condition to the rotatable main body or drive mandrel of the bit, to drill a bore hole substantially greater in diameter than the outside diameter of the drill pipe disposed in the bore hole. As an example, the bit members can pass through a drill pipe string of about 4" inside diameter, or through a hollow shaft turbine for rotating the drill bit having an inside diameter of about 4", and be capable of drilling a 9⅞" diameter hole when locked to the drive mandrel of the drill bit mechanism.

Still a further object of the invention is to provide a drill bit mechanism capable of movement through a string of drill pipe and withdrawal therethrough to the drilling rig, capable of drilling a bore hole more than twice the diameter of the minimum bore through the drill pipe or hollow shaft of a turbine through which the retractable bit members can pass.

Another object of the invention is to provide a rotary drill bit of the type above indicated, in which the individual bit members are properly oriented upon reaching the vicinity of the rotatable drive member at the lower end of the drill string, to insure their correct alignment with the mandrel slots into which they are expandable into appropriate coupled relation to the mandrel, for the transmission of torque and drilling weight between the mandrel and the individual bit members.

Another object of the invention is to positively block or lock the bit cutter members in their outwardly expanded condition in the drive mandrel secured to the lower end of the drill string, to prevent horizontal or radial forces incident to the drilling operation, such as drilling weight transmitted through the bit members, from shifting the bit members inwardly. Similarly, drilling weight and drilling torque imposed on the bit members through the drive mandrel cannot effect their inward shifting from their expanded position, the drilling weight and torque being transmitted directly between the drive mandrel and bit members.

Yet a further object of the invention is to provide a bit of the type above indicated, through which adequate drilling fluid can be circulated for removal of cuttings and for maintenance of the bit members in a clean and cool condition.

Another object of the invention is to provide a bit embodying diamond bit members movable through the drill pipe and drive mandrel secured thereto to be latched or locked to the drive mandrel and to be released therefrom for withdrawal through the mandrel and drill pipe to the drilling rig, in which the bit members have adequate peripheral diamond coverage to insure their effective and economical drilling of the bore hole. The bit members are so designed and arranged with respect to the drive mandrel as to maximize lateral stability of the bit, thereby preventing drill collar wobble, without exceeding the rotary torque capacity of the bit. In addition, the diamond bit member design is such as to secure maximum drilling rate without locally overloading the diamonds.

A further object of the invention is to provide a drill bit in which integral diamond bit members are used consisting of matrix materials in which the diamonds are set, eliminating steel cores to which the bit members are normally bonded, with the attendant elimination of stresses incident to the difference in physical properties between the matrix and steel core, resulting in increased strength and reliability of the bit members under high stress.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURES 1, 1*a* and 1*b* together constitute a longitudinal section through the apparatus, with portions shown in side elevation, with parts of the apparatus in condition for movement through its outer portion, FIGS. 1*a* and 1*b* being lower continuations of FIGS. 1 and 1*a*, respectively;

FIGS. 2, 2*a* and 2*b* are views corresponding to FIGS. 1, 1*a* and 1*b*, respectively, showing the parts locked in position within the outer or driving portion of the apparatus, FIGS. 2*a* and 2*b* constituting lower continuations of FIGS. 2 and 2*a*, respectively;

FIGS. 3, 3*a*, 3*b*, 3*c* and 3*d* are views, on an enlarged scale, corresponding to FIGS. 1, 1*a* and 1*b*, FIGS. 3*a*, 3*b*, 3*c* and 3*d* being lower continuations of FIGS. 3, 3*a*, 3*b* and 3*c*, respectively;

FIGS. 4, 4*a* and 4*b* are views, on an enlarged scale, corresponding to FIGS. 2, 2*a* and 2*b*, respectively, FIGS. 4*a* and 4*b* being lower continuations of FIGS. 4 and 4*a*, respectively;

Figure 1:
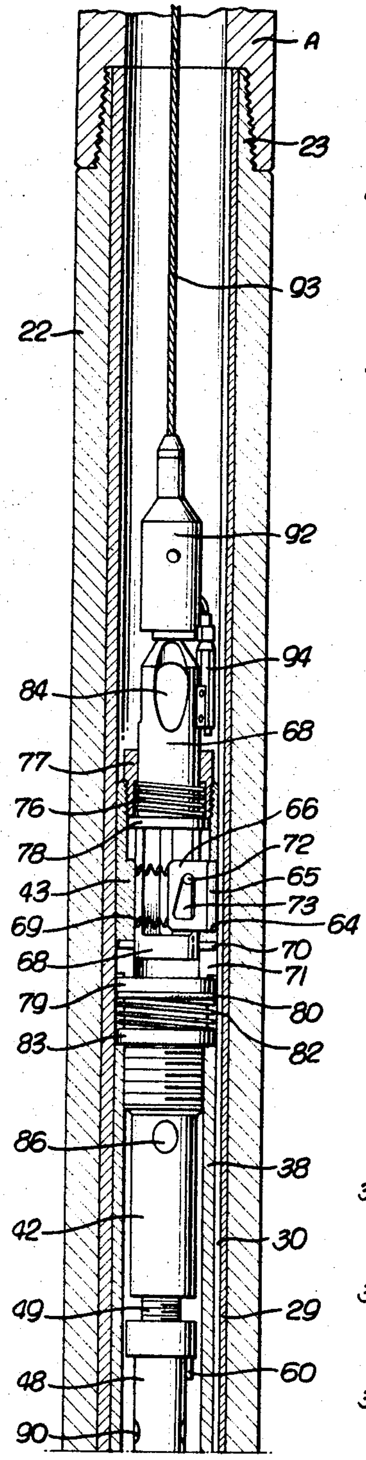
Figure 1A:
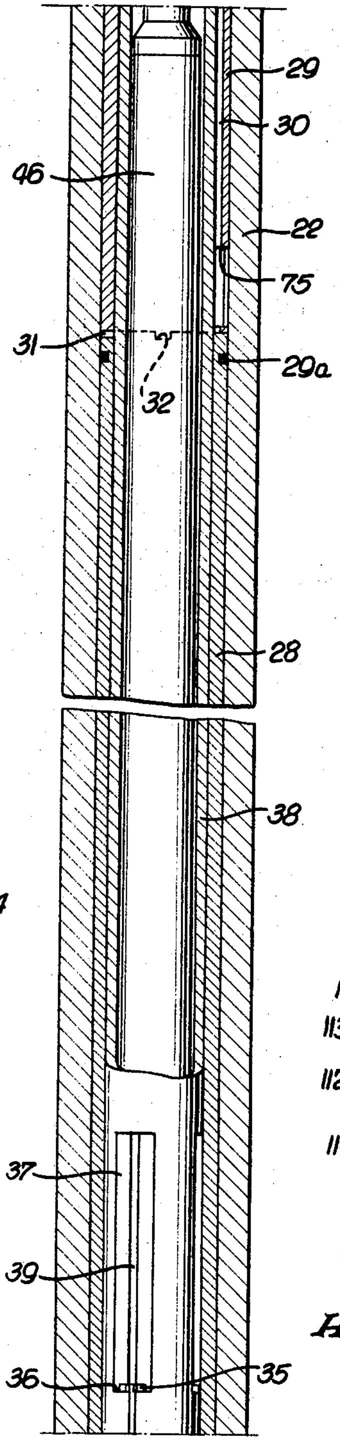
Figure 1B:
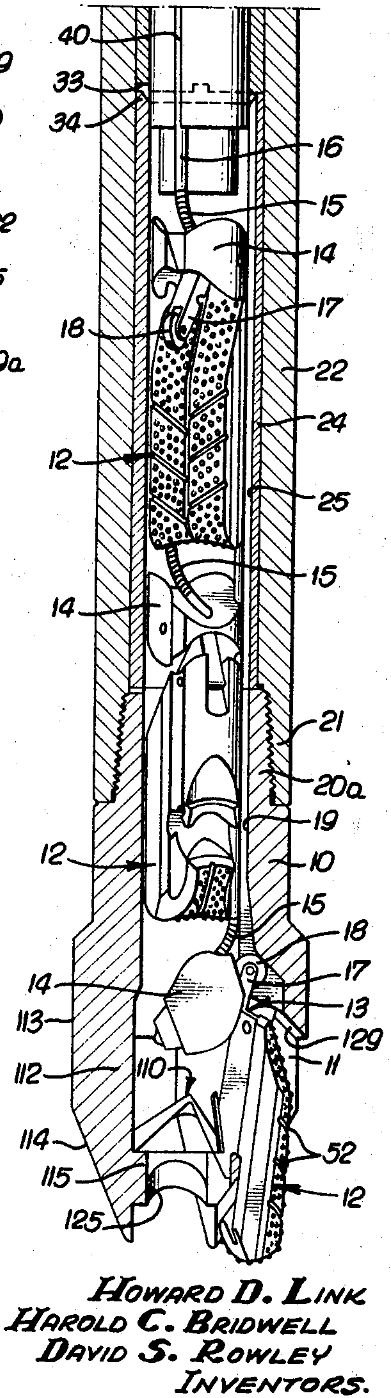

The specific retractable drill bit mechanism illustrated in the drawings is capable of drilling a bore hole and of providing a core which will pass into a coring mechanism movable as a unit with the drill bit portion of the apparatus through a string of drill pipe A between the drilling rig and the lower portion of the hole. The coring mechanism and the drill bit members are movable together through the drill string extending to the drill rig. The drill bit members are secured to the lower portion of the drill string, and the drilling weight and drilling torque are transmitted to it through rotation of the drill string, or, if desired, of a prime mover mechanism, such as a fluid operated turbine (not shown), which may be incorporated in the drill string near the lower portion thereof for rotating the drilling mechanism, this fluid operated turbine having a hollow rotor shaft of an appropriate inside diameter through which the retractable coring mechanism and the retractable drill bit members can pass in being moved into the lower portion of the drilling apparatus and in being released and retracted therefrom.

As specifically illustrated in the drawings, the coring and drill bit mechanism includes a lower drive mandrel 10 having a plurality of circumferentially spaced slots 11 extending through its wall into which drill bit pads or cutter members 12 are shifted to extend laterally outwardly beyond the periphery of the drive mandrel or main body member 10 of the drill bit. As disclosed in the drawings, there are three slots 11 in the drive mandrel, and three drill bit pads or cutter members, one for each slot, expandable into the slots to be locked to the drive mandrel, and which are also retractable from the slots. Each drill bit member 12 and its associated mechanism described hereinbelow are of a size capable of passing through the inside diameter of the drill string A and through the hollow rotor shaft of a turbine (not shown), if one is employed as the motive power mechanism for rotating the retractable rotary drill bit.

Each drill bit pad or cutter 12 has its upper end pin connected to a link 13, which, in turn, is pin connected to a pad or cutter follower 14 suitably secured to the lower end of a wire cable 15, as by silver soldering, the upper end of which is suitably secured, as by silver soldering, to the lower end of a rod 16, which may be round in cross-section and made of steel, extending upwardly within the drive mandrel 10 and adjacent to its inner wall. Each link 13 has a yoke portion 17 adapted to extend outwardly when its associated pad 12 is within the mandrel, rotatably carrying a pad orienting cam or wheel 18 on its outer portion adapted to ride within a longitudinal groove 19 in the inner wall of the drive mandrel, this groove being wider at its lower end 20 where it is inclined in a downward and outward direction within the drive mandrel and opens into the upper end of the mandrel slot 11. Since there are a plurality of bit cutters or pads 12 (three in the specific apparatus illustrated in the drawings), there is a link 13, pad follower 14, wire cable 15 and round steel rod 16 associated with each pad. In other words, there are three sets of pads, links, followers, cables and steel rods, and the sets are circumferentially spaced from one another about 120 degrees.

The drive mandrel has an upper threaded pin **20*a* threadedly secured to a companion box 21 of an elongate drive barrel 22 having an upper pin thread 23 for threaded attachment to the lower end of an adjacent drill string member A, which may either be a drill collar, or to the rotor of a turbine secured in the drill string. The drive barrel 22 is made of an appropriate length, depending upon the length of core to be produced and recovered at any one time. As an example, if the coring mechanism is to be capable of retaining a core of 30 feet in length, the drive barrel 22 would be in excess of 30 feet. The rotation of the drill string or turbine A is transmitted through the drive barrel 22 to the drive mandrel 10, and from the latter to the cutter pads 12 when they are locked in position within the mandrel slots 11**, as described hereinbelow.

Mounted within the lower portion of the drive barrel 22 is a final orienting sleeve 24 having a plurality of circumferentially spaced longitudinal orienting grooves 25 (FIGS. 10, 11) therein in alignment with the companion grooves 19 in the drive mandrel. Since three sets of cutter mechanisms are employed to be disposed 120 degrees apart, the orienting sleeve grooves 25 are spaced 120 degrees apart and are aligned with three grooves 19 spaced 120 degrees apart in the drive mandrel. The alignment is obtained by providing downwardly projecting pins 26 on the lower end of the final orienting sleeve received within companion sockets 27 in the upper end of the drive mandrel 10.

A coupling sleeve 28 of the same inside and outside diameter as the final orienting sleeve is disposed in the drive barrel 22, being of substantial length, and sealed against the drive member 22 by the seal ring 29*a*. Above this coupling sleeve is located an initial orienting sleeve 29 extending from the upper pin end 23 of the drive barrel downwardly, this initial orienting sleeve having a plurality of circumferentially spaced elongate internal grooves 30 which are aligned with the internal grooves 25 in the final orienting sleeve 24. Such alignment is obtained by having axially directed pins 31 at the lower end of the initial orienting sleeve received within sockets 32 in the coupling sleeve 28, the lower end of the coupling sleeve, in turn, having sockets 33 receiving pins 34 in the final orienting sleeve 24. Thus, the grooves in the initial orienting sleeve 29, and particularly the lower portions thereof, are aligned with the grooves 25 in the final orienting sleeve 24, and particularly the lower straight portions thereof, and with the grooves 19 in the drive mandrel. The coupling sleeve 28 need have no grooves in it at all, its inside and outside diameter conforming to the inside and outside diameters of the initial and final orienting sleeves, the inside diameter of all the sleeves being the same as the inside diameter of the central passage through the drive mandrel 10. The coupling sleeve 28 is rather long, its length depending upon the length of the core to be received within the coring mechanism.

The sets of pads 12, links 13 and pad followers 14 are movable through the string of drill pipe A and drive barrel 22 in tandem or series relation, which will permit the cutter pads, links, and followers to be made of substantial size, being only slightly smaller in maximum transverse dimension than the minimum diameter through the drill string A, orienting sleeves 29, 24 and drive mandrel 10. To enable such series or tandem movement to take place, the longitudinal supporting rods 16 are made of different lengths, and these rods each have upper heads 35, such as T-shaped heads, adapted to rest against the lower ends or shoulders 36 of circumferentially spaced elongate grooves 37 formed in the periphery of the outer carrier barrel 38 of the coring mechanism, the bottom of each groove being flat and having a half circular recess 39 therein in which the elongate rod 16 can move, this rod also extending slidably through a companion recess 40 in the lower portion of the carrier barrel 38 below its groove 37.

Thus, during lowering of the coring mechanism and the cutter devices through the string of drill pipe A and its elevation therethrough, the T-shaped heads 35 rest upon the carrier barrel shoulders 36. The uppermost set of a pad 12, link 13 and pad follower 14 is connected through the wire cable 15 to a rod 16 of relatively short length, the intermediate set of a rod of longer length, so that such set can hang below the uppermost set, and the lowermost set being suspended from a steel rod 16 of a substantially greater length than the intermediate rod, so that such set will remain suspended below the intermediate pad 12. As described hereinbelow, when the pads are expanded outwardly in the drive mandrel slots 11 and are locked in position, the coring mechanism will move downwardly behind the sets of cutter members 12, 13, 14, the carrier barrel 38 sliding downwardly along the rods 16, the heads 35 of which are free to move relatively upwardly within the longitudinal grooves 37.

The core barrel mechanism, as stated above, is movable through the drill pipe string A and through the drive barrel 22. The carrier barrel 38 is of extended length, depending upon the length of core to be retrieved. It has a seal 41 secured to its lower end, its upper end being threadedly attached to an adapter coupling 42 threadedly secured to a latch body 43, and also to the outer housing portion 44 of a swivel 45, which will permit the carrier barrel 38 to rotate without rotating an inner core barrel 46 extending within the outer barrel from the lower end of the latter to a position near the swivel. The outer and inner barrels 38, 46 are spaced from one another to provide an annular fluid passage 47 therebetween for the drilling fluid used for circulating the cuttings from the bore hole and for cleaning and cooling the bit cutter members, as described hereinbelow. The upper end of the inner barrel 46 is threadedly secured to a coupling 48, which, in turn, is threadly attached to a hollow bearing stem 49 having an external flange 50. A lower ball bearing 51 is mounted between the lower end of the external flange 50 and a lower internal flange 52 of the swivel housing 44, there being an upper ball bearing 53 between the upper end of the external flange 50 and the lower end of the adapter coupling 42. Accordingly, the outer or carrier barrel 38 can rotate with the drill bit members without rotating the inner barrel 46.

As disclosed, fluid in the inner barrel 46 can pass upwardly through a bleeder passage 54 in a pressure relief valve member 55 threadedly secured to the coupling 48, this passage having an upper valve seat 56 engageable in a downward direction by a ball check valve member 57, the upward movement of the ball check valve member from its seat, to permit upward flow of fluid through the bleeder passage, being limited by a stop pin 58 extending across the central passage 59 through the coupling.

The inner barrel coupling 48 is adjustably and threadedly secured to the bearing stem 49, being prevented from turning with respect thereto by a key 60 mounted in a coupling slot 61, extending downwardly from the upper end of the coupling, and received within a keyway 62 in the bearing stem, a plurality of cap screws 63 extending through the key 60 and the coupling 48 to retain the key in place and to clamp the split portion of the coupling to the bearing stem 49.

The coring mechanism is releasably latched to the drive barrel 22, as by releasably securing it to the orienting sleeve mechanism. Such releasable latch device includes the latch body 43 previously described, which has a single transverse slot 64 therethrough through which a laterally shiftable final latch and orienting member 65 is slidable. This latch has inwardly directed parallel side arms 66 extending into side grooves 67 in a retracting rod 68 slidable longitudinally in the latch body 43, helical compression springs 69 engaging the inner ends of these arms and bearing against the latch body to urge the final latch 65 in an outward direction. The retracting rod 68 is prevented from turning within the latch body 43 by a pin 70 shiftable in a longitudinal latch body slot 71, the retracting rod 68 having retracting pins 72 extending laterally therefrom and received within slots 73 in the latch arms, the inner side of each slot having a tapered or cam face 74 inclined in an upward and outward direction to be engaged by its associated retracting pin 72 upon upward movement of the retracting rod, to shift the latch 65 inwardly completely from its slot or opening 75 in the final orienting sleeve 29, and thereby to release the coring mechanism from such sleeve and from the drive barrel 22.

The retracting rod 68 is normally urged in a downward direction by a helical compression spring 76 bearing against a cap 77 threadedly secured within the upper end of the latch body 43, the lower end of the spring bearing against a retracting rod flange 78. When the retracting rod is in its downward position, its pin 70 bears against a ring 79, which forces a rubber or rubber-like seal ring 80 against a sleeve 81 encompassing the adapter coupling 42, the sleeve being urged against the seal ring by a helical compression spring 82 bearing against the sleeve and against an external shoulder 83 on the adapter coupling. The pliant, elastic seal ring 80 has an unrestrained external diameter slightly less than the internal diameter of the orienting sleeve coupling 28. However, when the retracting rod 68 is disposed in its lowermost position, with its pin 70 bearing against the ring 79, in order to shift the latter toward the sleeve 81 and compress the seal ring 80, the latter is expanded outwardly into sealed relation against the inner wall of the orienting sleeve coupling to prevent leakage of fluid along such wall.

The circulating fluid used in drilling can flow through the drill pipe string A and into the upper end of the drive member 22 and the orienting sleeve 29, passing through ports 84 in the retracting rod 68 to its central passage 85 and flowing therefrom through the latch body 43 into the adapter coupling 42, from which the fluid can flow through circulation ports 86 into the annular space 87 between the outer barrel 38 and the housing 44, passing downwardly therefrom through the annular space 47 between the inner and outer core barrels to the lower end of the latter. Fluid can also pass through the central passage 88 of the adapter coupling 42 into the central passage 89 through the bearing stem 49 and into the inner barrel coupling 48, passing outwardly through side ports 90 in the latter above the ball check valve 57 and into the annular space 47 between the inner and outer core barrels 46, 38.

The retracting rod 68 has an upper head 91 adapted to be engaged by a suitable overshot 92 secured to a wire line 93, by means of which the entire mechanism is lowered through the drill pipe string A and into the drive member 10 and drive barrel 22, and is also withdrawn therefrom. The lowering will occur until the final latch 65 expands outwardly into its companion slot 64 in the upper orienting sleeve 29, at which time a suitable telemeter microswitch 94 on the retracting rod 68 will be closed and convey a signal through the electrically conductive wire line 93 to the drilling rig, advising the operator that the mechanism has been latched in final position. Similarly, elevation of the wire line 93 with its overshot 92 connected to the head 91 will elevate the retracting rod 68 and cause its pins 72 to retract the latch 65 from the slot 64, which will be accompanied by suitable actuation of the telemeter microswitch, advising the operator that the mechanism has been unlatched and in its condition to be released from the drive mandrel 10 for withdrawal through the string of drill pipe A to the top of the bore hole.

The coring mechanism and the drill bit members arranged in tandem suspension from the carrier barrel 38 through the agency of the rods 16 are lowered through the passage in the string of drill pipe A and also through the hollow turbine rotor shaft, assuming a turbine is used in the drill string, on the wire line 93. The drill bit pads or members 12 are suspended substantially 120 degrees from one another (since three cutter pads are used in the specific tool shown in the drawings) because of the fact that the suspension rods 16 are disposed 120 degrees from one another, and these pad members 12 are oriented with respect to the slots 11 in the drive mandrel 10 by means of the final and initial orienting sleeves 29, 24, both the follower rollers 18 and the final latch 65 of the coring mechanism serving to achieve the appropriate orienting.

Figure 10:
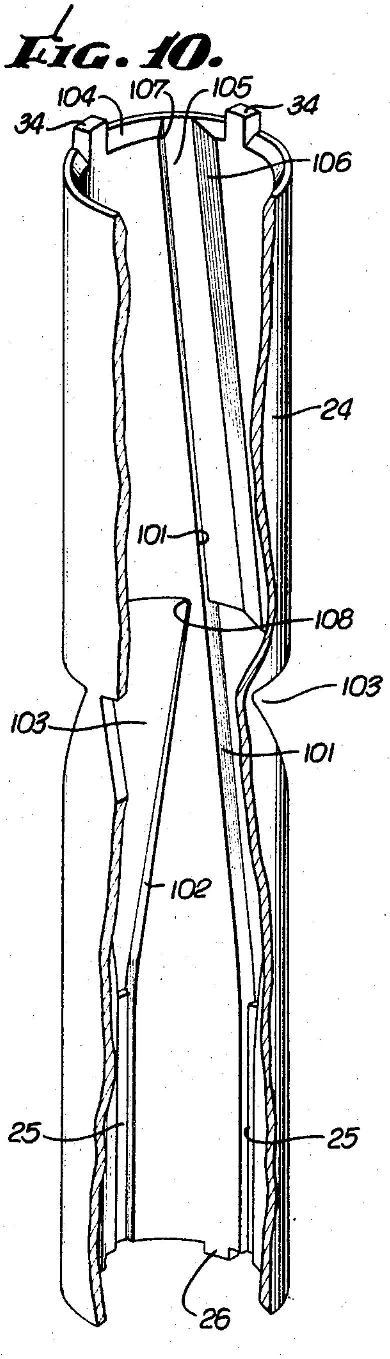
FIG. 10 is an isometric projection, with parts broken away, of the lower or final orienting sleeve.
Figure 11:
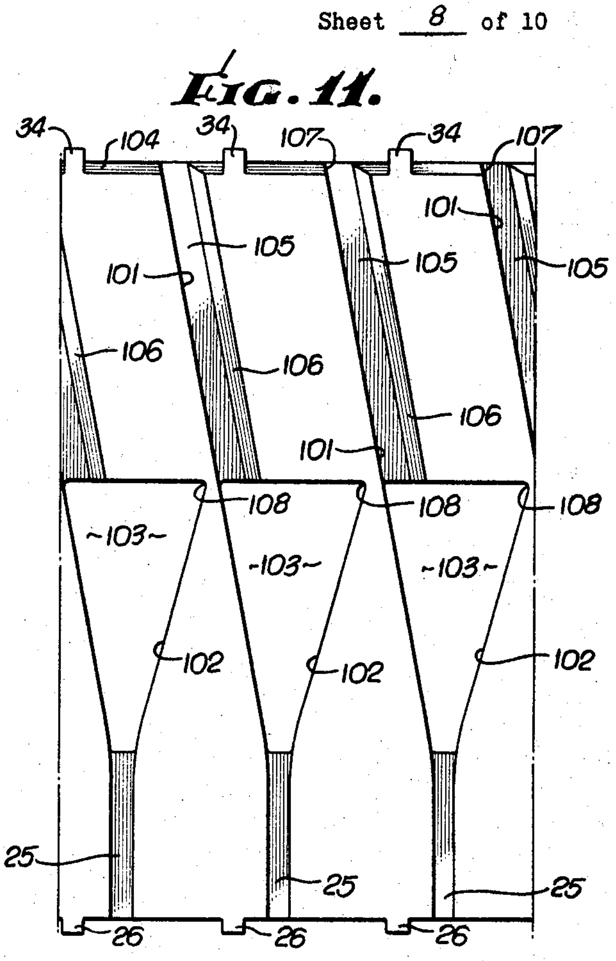
FIG. 11 is a diagrammatic view in a single plane (not to scale) of the orienting sleeve disclosed in FIG. 10.
Figure 9:
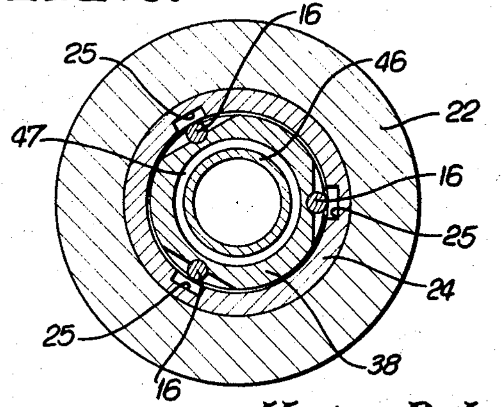
FIG. 9 is a cross-section taken along the line 9—9 on FIG. 4*b*.
Figures 12, 13, 14:
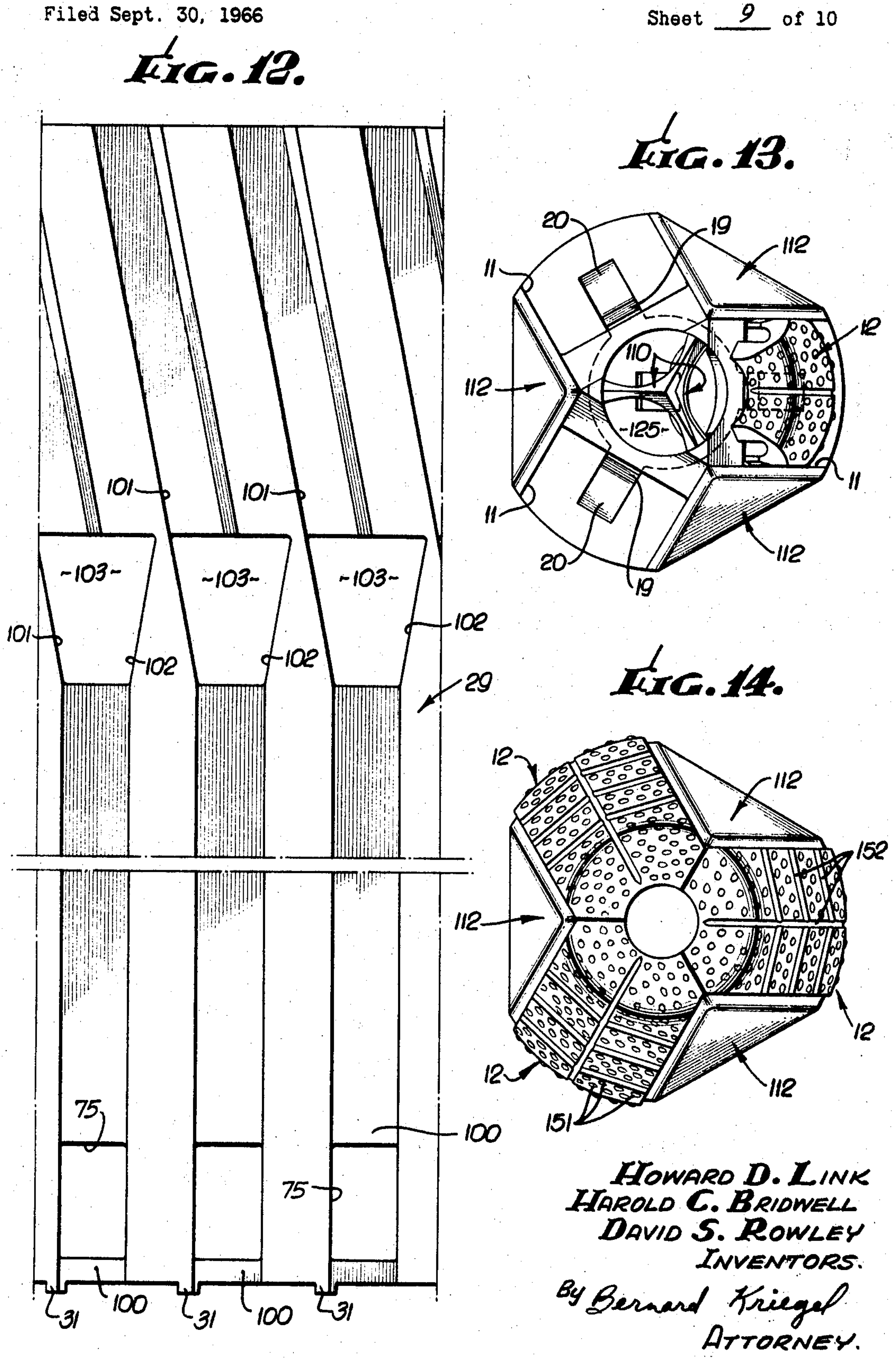
FIG. 12 is a diagrammatic view in a single plane of the upper or initial orienting sleeve.
FIG. 13 is a plan view as seen from the bottom of FIG. 3*d*.
FIG. 14 is a plan view as seen from the bottom of FIG. 4*b*.

The initial and final orienting sleeves 29, 24 are essentially the same in structure, although the width of the lower portions 100, 25 of their orienting grooves are different, the width of the orienting grooves 25 in the final orienting sleeve being but slightly wider than the width of the pad orienting rollers 18; whereas, the lower portions 100 of the grooves of the initial orienting sleeve are but slightly wider than the width of the final latch 65 of the coring mechanism (FIGS. 10, 11, 12). Appropriate inclined guide surfaces 101, 102 are provided on both orienting sleeves for insuring the guiding of the final latch 65 into one of the orienting grooves 100 of the upper orienting sleeve 29 and of the rollers or cams 18 into the grooves 25 of the lower orienting sleeve 24. FIGS. 10 and 11 disclose the lower or final orienting sleeve 24, the lower longitudinal grooves 25 of which have a width slightly greater than the width of the rollers 18, as described hereinabove. Each of these grooves terminates at a window 103 having sides 101, 102 that diverge in an upward direction. The right side 102, as disclosed in FIG. 10, terminates at the upper end of the window or opening 103; whereas, the left side 101 continues upwardly beyond the window, its inclination continuing to the upper inwardly bevelled surface 104 of the lower orienting sleeve and constituting the left side of an upper groove 105 opening through the upper end of the sleeve. This groove has its left side 106 tapered from the base of the groove to the inner surface of the sleeve 24. It is to be noted that the upper end 107 of the left side 101 of each groove extends circumferentially beyond the upper end 108 of the right side of an adjacent window 103; that is, the upper left side of an inclined guide surface 101 that is associated with one window overlaps the right guide surface 102 of an adjacent window. Thus, the roller 18 of the lowermost set of bit members constituting the cutter pad 12, link 13, and pad follower 14 will engage either the left or right guide surface 101, 102 of one of the windows 103 and grooves 105 in the final orienting sleeve 24 as the apparatus is being lowered through the latter, which will turn the drill bit member 13 into a position in which the lower pad 12 is in alignment with one of the slots 11. Actually, before the lowermost roller 18 engages the final orienting sleeve, the final latch 65 of the coring mechanism will have engaged either the left or right downwardly tapering guide surfaces 101, 102 of the initial orienting sleeve 29, and such latch will rotate the carrier barrel 38 and the entire coring mechanism, as well as the rods 16, cables 15, followers 14, links 13 and cutter pads 12 with it, as the entire assembly moves down through the drive barrel 22 and the orienting sleeves 29, 24 and coupling sleeve 28, until the final latch 65 is disposed in one of the longitudinal grooves 100 of the initial orienting sleeve 29. This will substantially orient the several rollers 18 on the links 13 with the longitudinal grooves 25 in the lower orienting sleeve 24. However, if they are angularly displaced from such grooves, they will individually engage either the right or left guide surfaces 102, 101 of the orienting sleeve, which will shift them angularly to a position in which the rollers move into the longitudinal grooves 25, insuring the appropriate alignment of each pad 12 with an individual slot 11 in the drive mandrel, and also into appropriate alignment with pivoted cam or pad ramps 110 pivotally mounted in the drive mandrel 10 at its lower portion, in order to deflect each pad 12 into its individual slot 11. Downward movement of the coring mechanism can continue until the final latch 65 expands outwardly into one of the latch slots 64 in the lower portion of the upper orienting sleeve 29, at which time the carrier barrel 38 will be located behind the sets of pads 12 and followers 14 to lock them in their outward position, as described in detail hereinbelow.

The drive mandrel has circumferentially spaced legs 112 which are defined by the mandrel slots 11, the legs having cylindrical upper portions 113 and downwardly tapering lower portions 114. The lower portions of the legs are interconnected by an annular strut or cutter pad locator support 115, the legs pivotally mounting the pad ramps or deflector cams 110. Each pad ramp 110 is disposed in transverse alignment with a drive mandrel slot 11, and includes an upper portion 116 of generally triangular shape with its apex 117 adapted to extend to the axis of the drive mandrel 10. It is pivotally mounted on hinge or pivot pins 118 extending from each lower leg 119 of a ramp into an adjacent hole or opening **120*a* in a mandrel leg 112, there being suitable biasing means tending to urge the upper portion 116 of the ramp inwardly toward the axis of the mandrel, such as coil springs 120 disposed around the hinge pins, with one arm 121 of the spring bearing against a stop 122 affixed to the mandrel leg and the other arm 123 bearing against the ramp, so as to swing it inwardly toward the mandrel axis. Each ramp swings inwardly to position its apex 117 at the axis of the drive mandrel, so that the three ramps collectively overlie the central passage 125 through the annular strut 115, each of them being in alignment with a mandrel slot 11. The inside diameter of the annular strut conforms to the external diameter of the lower portion 126 of the outer core barrel 38, which is reduced in diameter with respect to the core barrel diameter thereabove to provide a shoulder 127 on the barrel adapted to engage the upper end of the annular strut 115, and thereby limit the downward movement of the coring mechanism within the drive mandrel 10 and the drive barrel 22 thereabove. At this time, the final latch 65 will be in position to snap into the lock slot 64 in the upper orienting sleeve 29**.

Each cutter pad 12, when locked in expanded position within the mandrel slot, has an upper end surface 128 which is tapered to conform with the upper tapered outer end portion 129 of the mandrel slot, an upper surface 130 of the pad extending downwardly from the tapered end surface and parallel to the axis of the drive mandrel, this upper surface being curved circumferentially to conform to the curvature of the diameter of the well bore being drilled. The upper parallel surface 130 of the pad or cutter member merges into a downwardly tapering surface 131 adapted to drill a tapered bore in the bottom of the hole, this tapered surface merging into a lower end face or surface 132 extending inwardly toward the axis of the drive mandrel and merging upwardly into an inner coring surface 133 having a curvature conforming to the radius of the core to be formed by the bit pads or members 12. The upper end 134 of this inner surface terminates closely adjacent to the lower end of the outer barrel 38 when its shoulder 127 engages the annular strut 115, which is the final latched position of the coring mechanism within the drive barrel 22 and mandrel 10, the lower portion 135 of the inner core barrel terminating a slight distance upwardly from the lower end 136 of the outer carrier barrel 38 and containing the usual core catcher ring 137 to prevent the core from dropping out of the inner barrel 46 when the coring mechanism is being elevated through the drive mandrel 10 and drill string A to the drilling rig. Such core catcher 137 is conventional in coring apparatus and need not be described in detail.

Each drill bit cutter or pad 12, when locked in expanded position within the drive mandrel 10, also has a downwardly tapering inner surface 138 extending from its upper end, which is engaged by a companion outer surface 139 on its pad follower 14 when the latter is shifted outwardly against the bit pad 12, the upper end of the pad follower engaging the inner upper tapered surface 140 of the drive mandrel defining the upper end of the slot 11. The inner surface 141 of the back face of the pad follower 14 is concavely curved to conform to the periphery of the carrier mandrel 38, which it will snugly engage, the outer surface or face 139 of the follower also being concavely curved and conforming to a companion convex curvature on the inclined inner surface 138 of the pad 12.

Each pad also has a hook 142 at its inner portion defining a downwardly opening recess 143 with the main body of the pad adapted to receive the upper portion 144 of the annular strut or pad locator support 115 extending across a mandrel slot 11. As the pad 12 is being expanded outwardly to its final position, the hook

Figure 4:
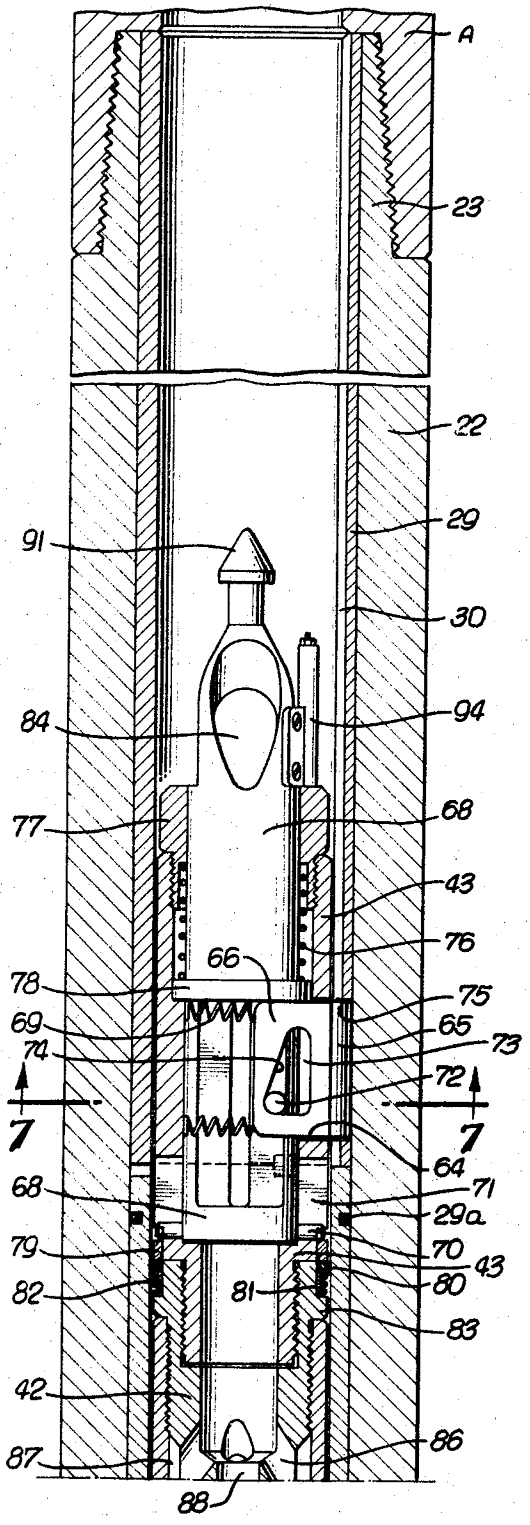
Figure 4A:
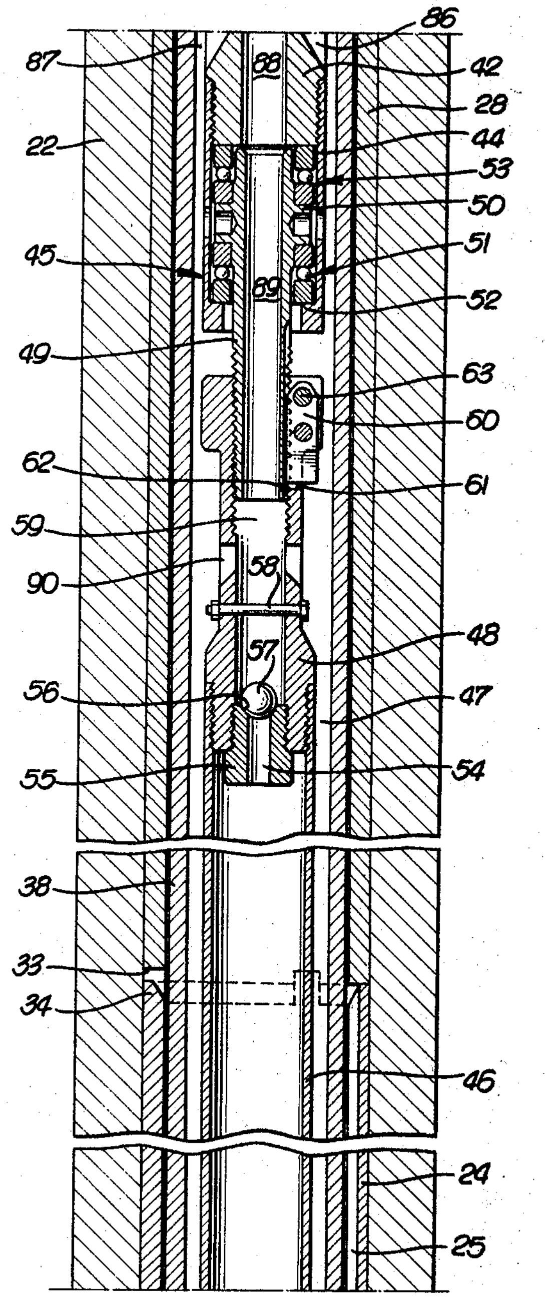
Figures 4B, 5, 6:
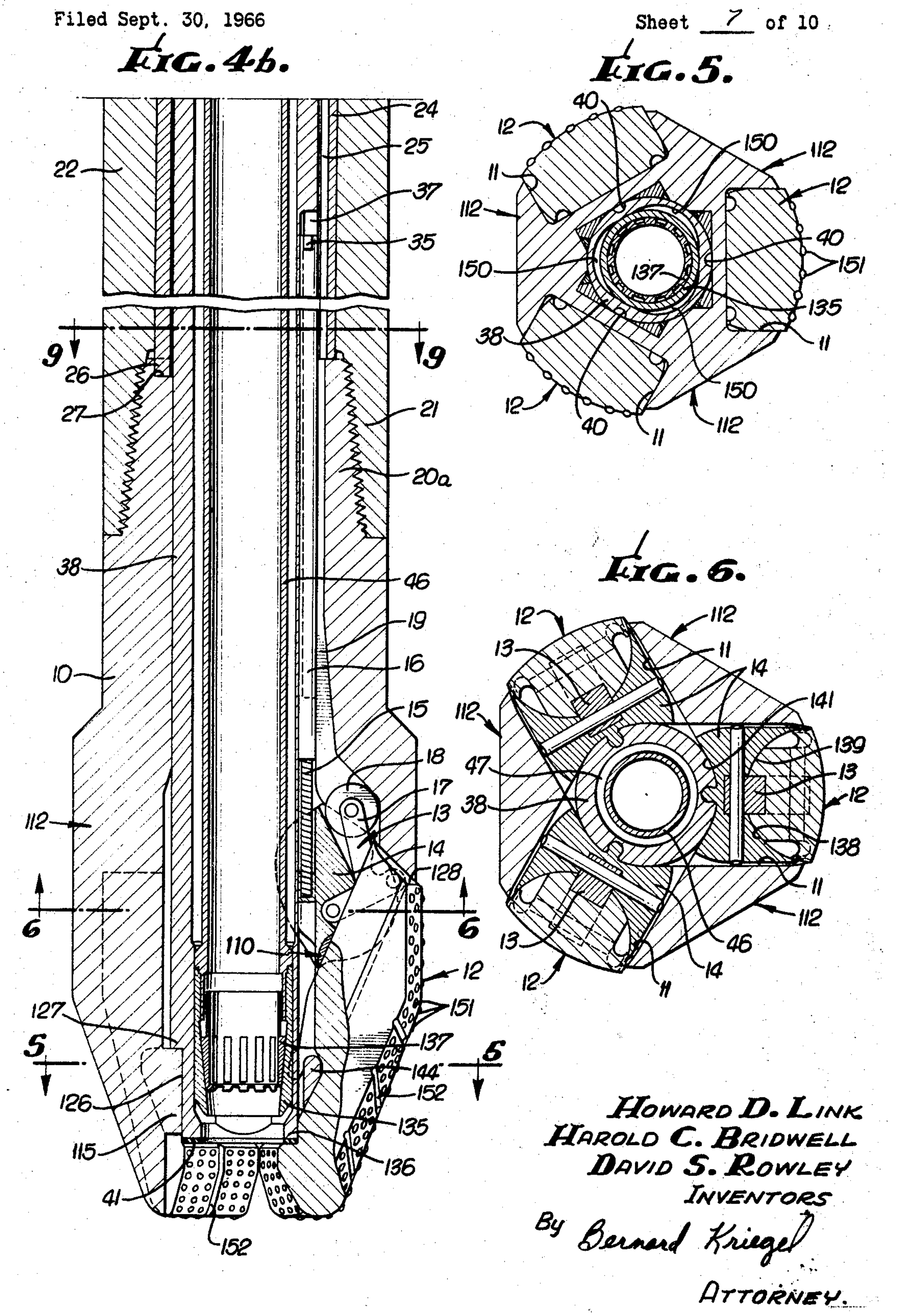
FIG. 5 is a cross-section taken along the line 5—5 on FIG. 4*b*.
FIG. 6 is a cross-section taken along the line 6—6 on FIG. 4*b*.
Figures 15, 16, 17:
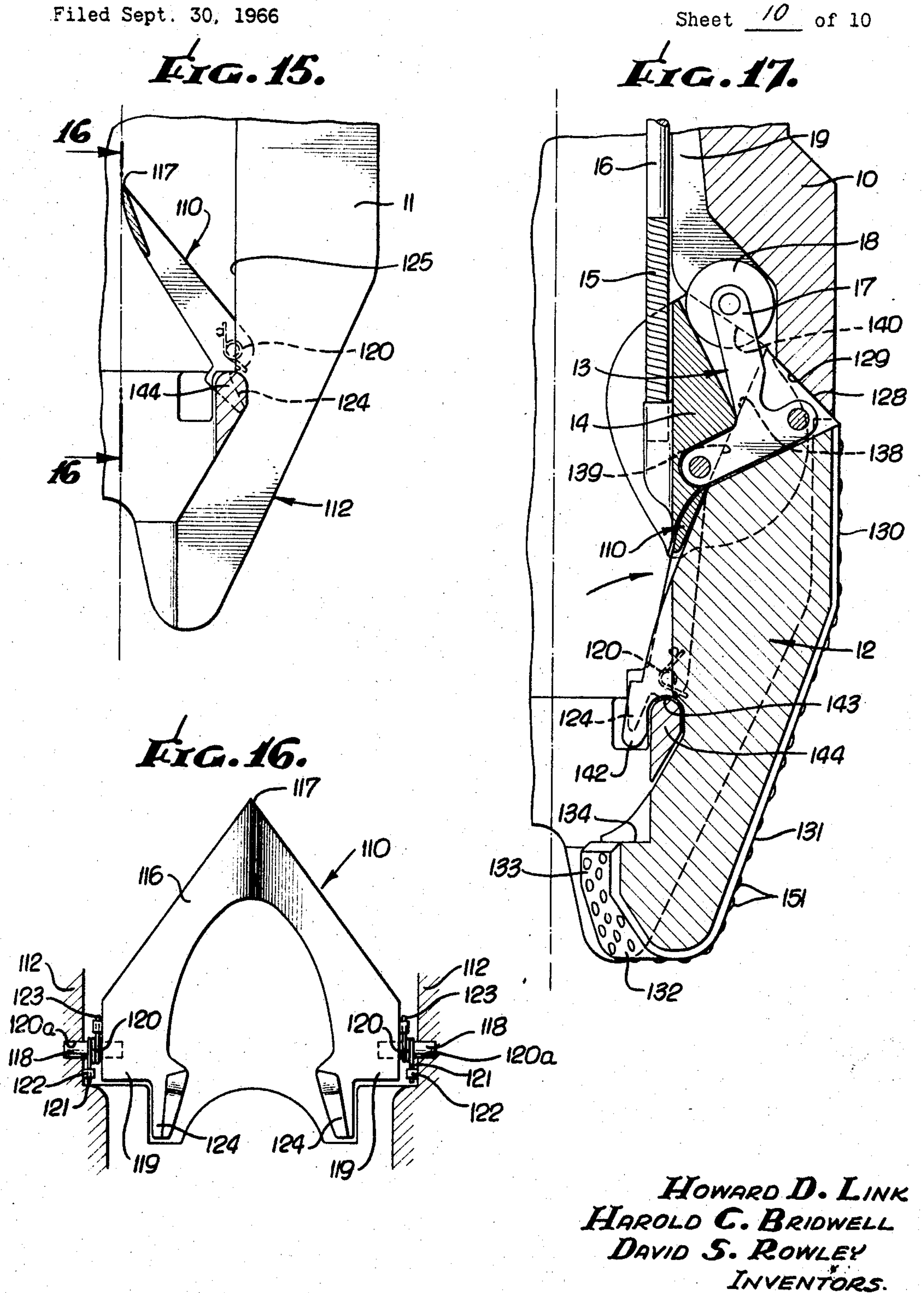
FIG. 15 is a fragmentary longitudinal section through the lower portion of the bit mandrel and one of its pad ramps.
FIG. 16 is a view taken along the line 16—16 on FIG. 15.
FIG. 17 is a fragmentary vertical section, on an enlarged scale, of one of the cutter assemblies locked in position within the drive mandrel.

142 will move downwardly over the portion 144 of the annular struct and the pad will swing outwardly about this strut as a pivot until its upper portion has been swung completely into the slot, and with its upper outer surface 130 parallel to the axis of the drive mandrel 10, and with its upper end 128 engaging the upper end 129 of the slot, such as disclosed in FIGS. 4*b* and 17. At this time, the strut portion 144 extending across the mandrel slot is snugly received within the recess 143, the recess wall conforming to the shape of the strut. When the pad 12 is swung outwardly to its final position, its inner coring surface 133 is then also extending parallel to the axis of the drive mandrel and at the appropriate radius from such axis, so as to produce the desired diameter of core in drilling the formation. When in this position, the gasket seal 41 at the lower end of the outer carrier barrel 38 engages the shoulder 134 on the inner portions of each cutter pad.

Figure 2:
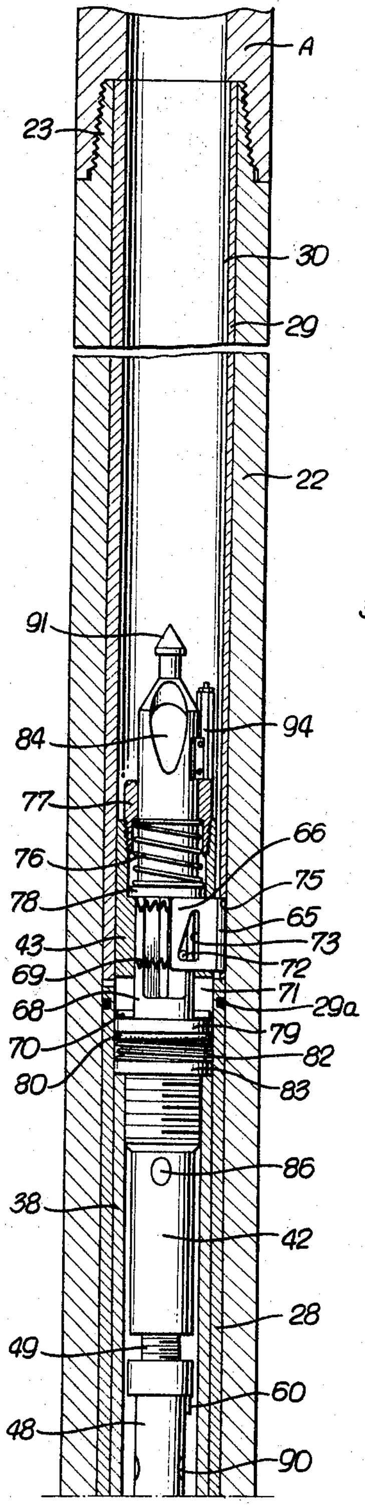
Figure 2A:
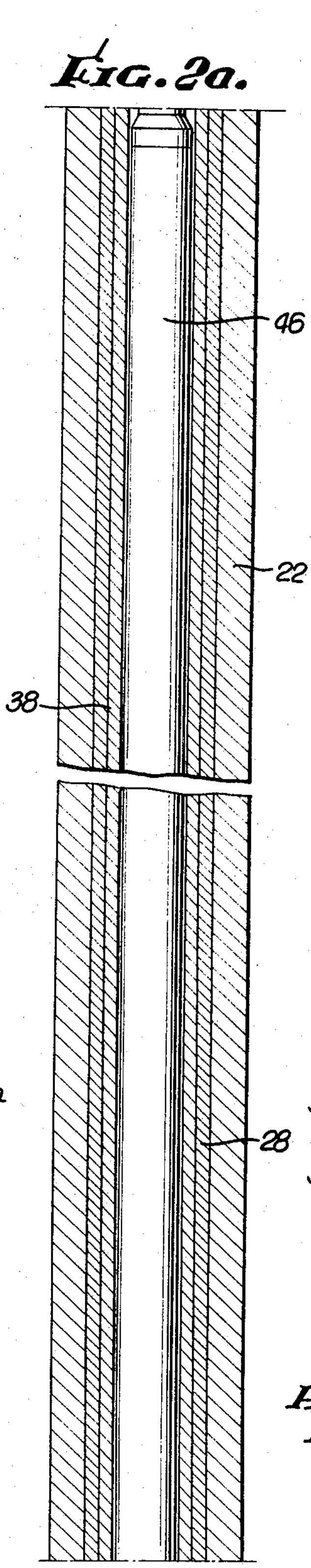
Figure 2B:
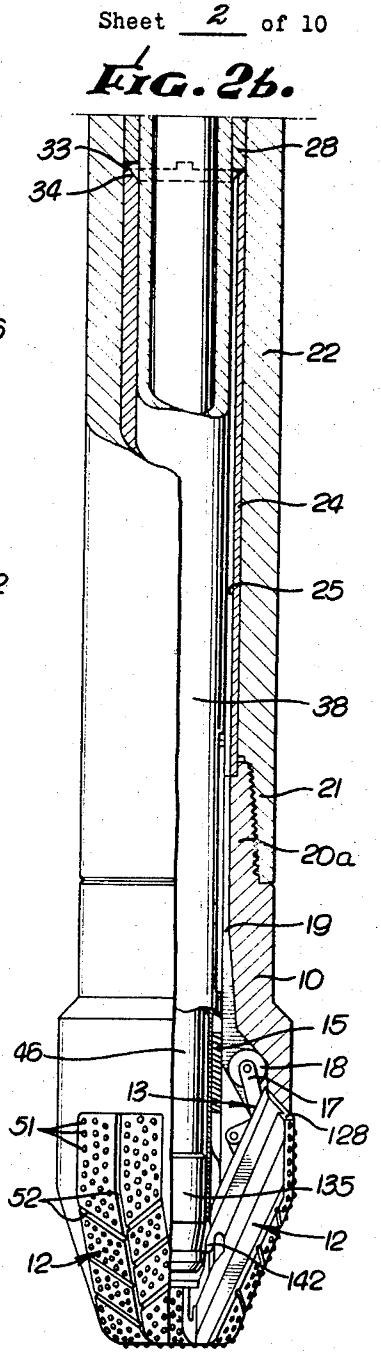

Assuming the cutter pads 12 have been expanded outwardly and the outer barrel 38 has been lowered to its final position, as illustrated in FIGS. 2*b* and 4*b*, the drilling fluid will pass downwardly through the annular space 47 between the inner and outer barrels 46, 38 and then through the arcuate fluid passages 150 provided between the lower inner portions of the outer barrel and the periphery of the inner barrel (FIG. 5), discharging around the lower end of the inner barrel 46 and into the bore hole. Each bit pad has cutting elements 151 mounted in its outer end and inner surfaces 130, 131, 132, 133, which are preferably diamonds set in a suitable matrix of which each pad 12 is formed. As specifically disclosed, the diamond cutting elements 151 extend in a desired pattern over the end face 132 of each pad along its inner coring face 133, over its tapered drilling face 131, and also over its upper gauge face 130. Suitable waterways 152 are provided in each pad to insure the flow of circulating or drilling fluid and the cuttings upwardly around each pad 12, through the annular space between the wall of the bore hole and the drive mandrel 10, the drive mandrel barrel 22, and drill string A, to the drilling rig, the circulating fluid also maintaining the bit pads and diamond matrix portions in a clean and cool condition.

Assuming the drill string A, drive mandrel barrel 22 and mandrel 10 are disposed in the well bore near its bottom, and without the coring mechanism and drill bit mechanism disposed therein, the latter are lowered as a unit on the wire line 93 from the drilling rig through the drill pipe A and through the hollow mandrel of a turbine rotor, if a turbine rotor is used as a source of motive power for rotating the drill mechanism, with the sets of bid pads 12, links or pad orienting cams 13 and pad followers 14 suspended through the cables 15 and rods 16 from the carrier barrel 38 and arranged in series or tandem fashion. The bit pads 12 can be of substantial size. There need merely be working clearance for them to pass through the minimum diameter passage in the entire drill string A and hollow turbine rotor shaft (if a turbine is used). If, for example, the minimum diameter through which the mechanism must pass is 4 inches, then the bit pads 12 need only be slightly less than 4 inches in maximum transverse dimension, which is also true of the pad follower 14 and the core barrel apparatus. The entire string of mechanism is lowered on the overshot 92 and electric wire line 93, the lowermost leading bit pad 12 entering the upper initial orienting sleeve 29 and passing therethrough. The lowermost pad follower 18 may or may not be affected by the tapered guide surfaces 101, 102 of this upper orienting sleeve, the link roller being shiftable along its surfaces and into and out of one of its windows 103. Such roller 18 may engage one of the tapered sides 101, 102 and effect a partial turning of the entire coring mechanism suspended from the overshot 92 and wire line 93, althrough this is not essential to the appropriate operation of the apparatus.

Figure 3:
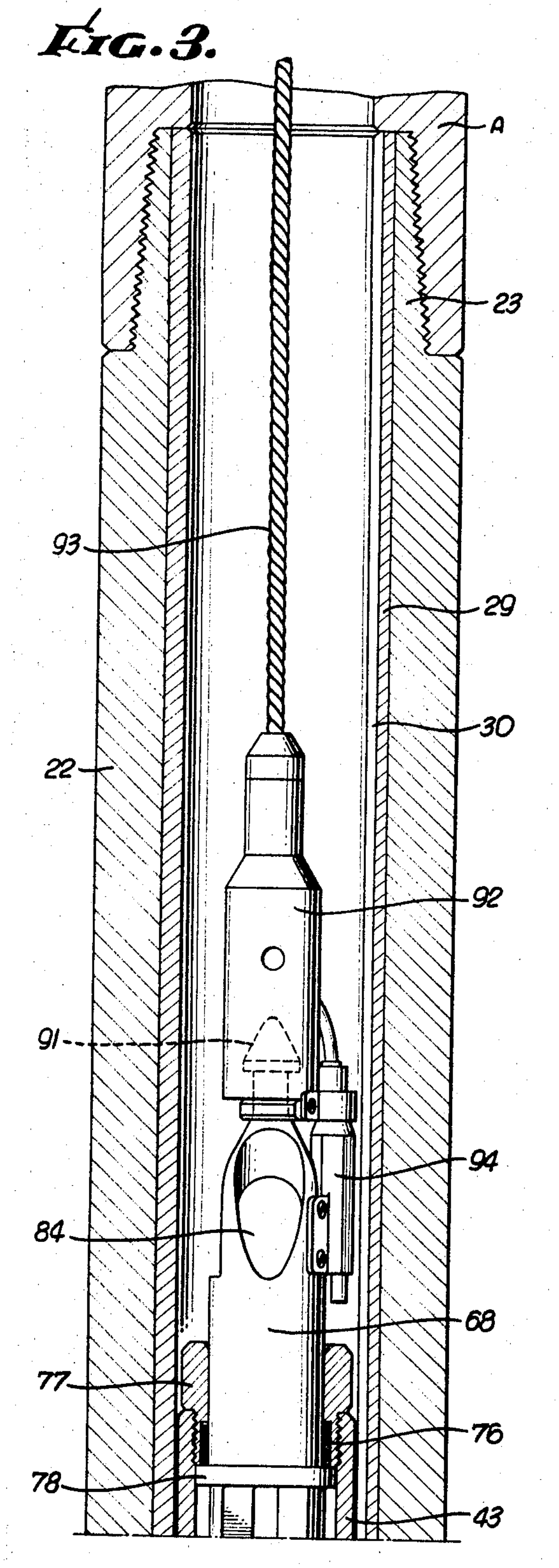
Figure 3A:
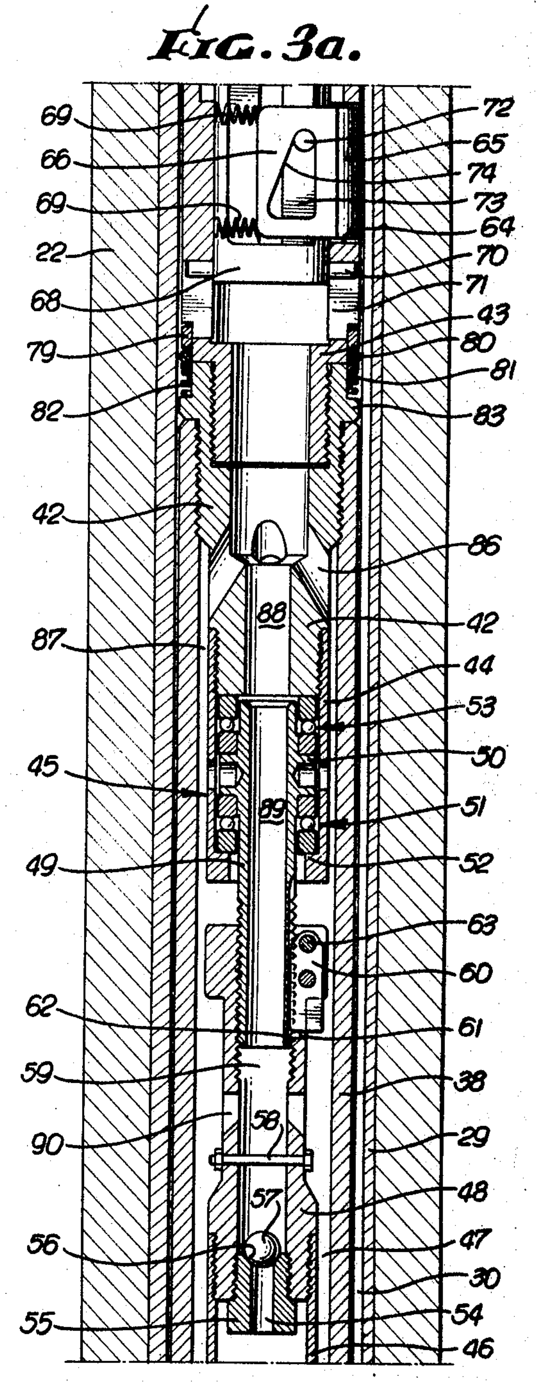
Figure 3B:
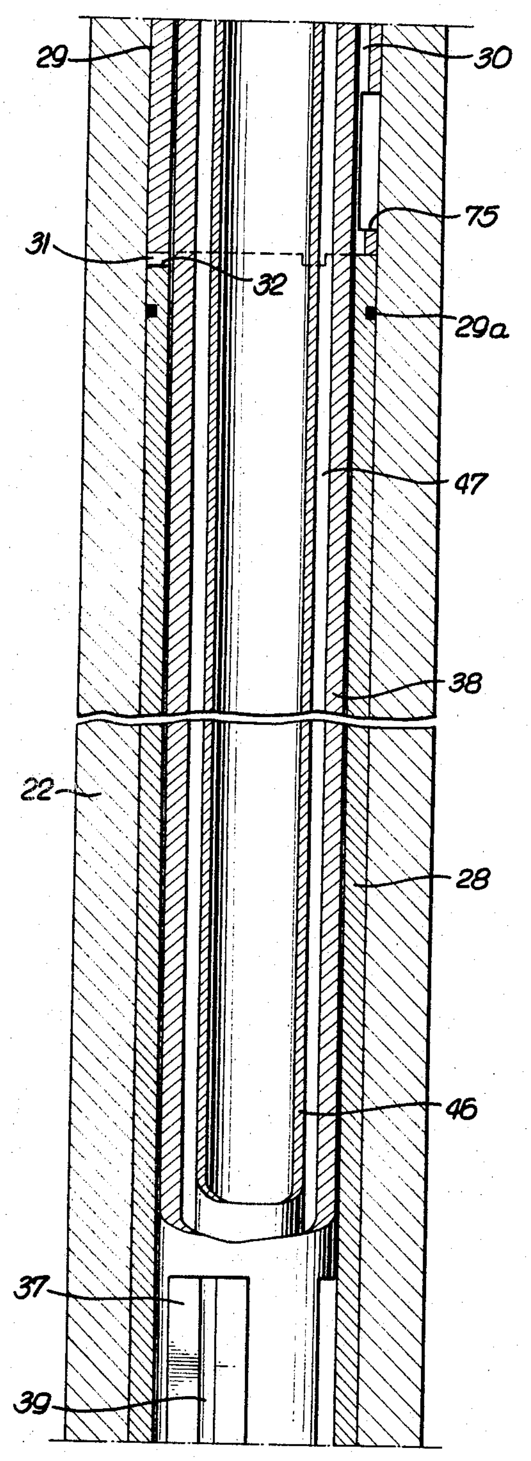
Figure 3C:
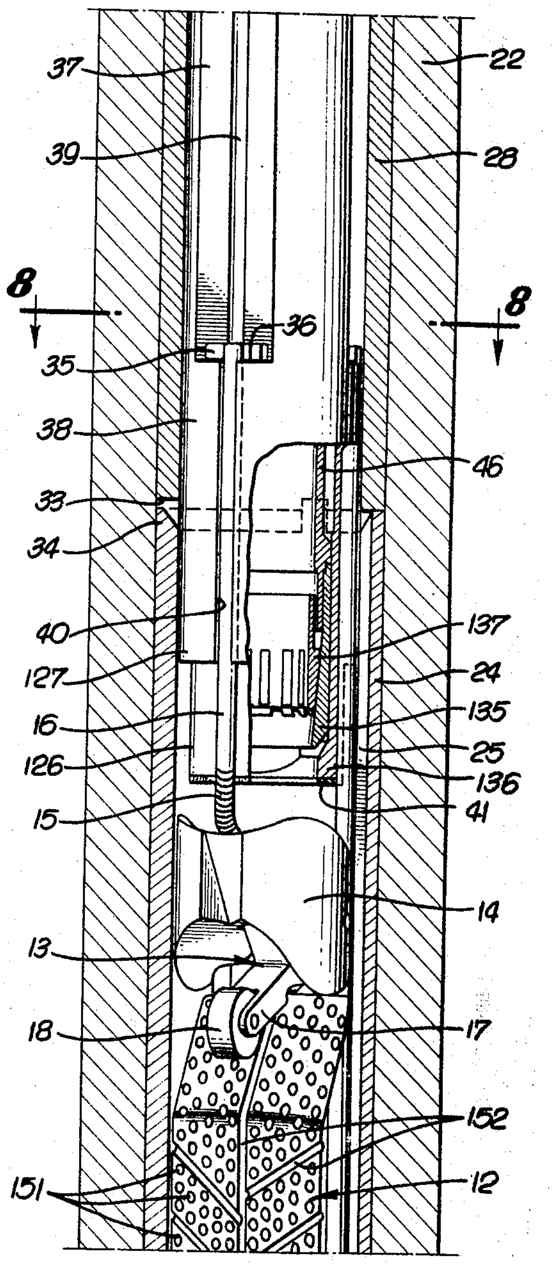
Figure 3D:
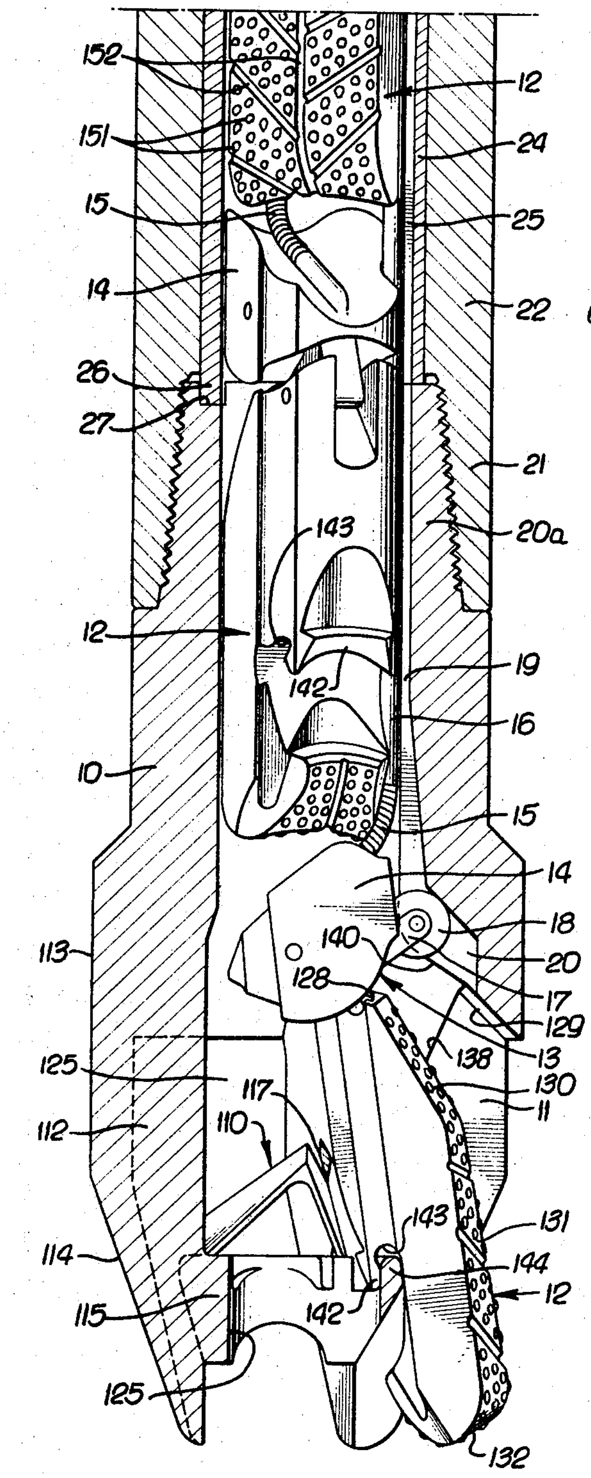
Figure 7:
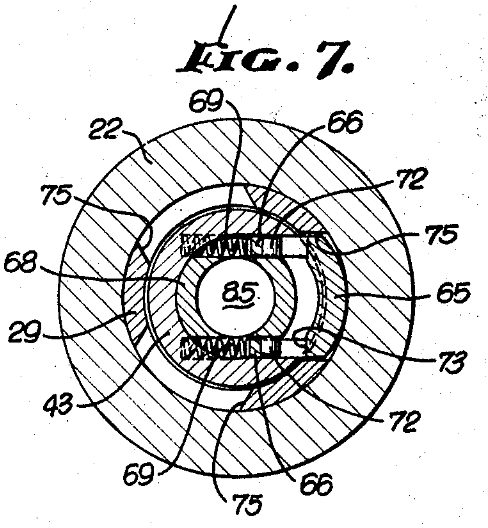
FIG. 7 is a cross-section taken along the line 7—7 on FIG. 4.
Figure 8:
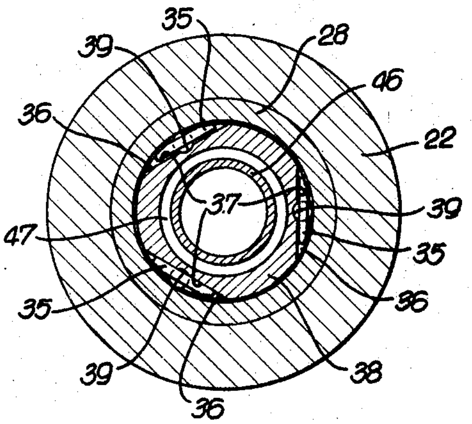
FIG. 8 is a cross-section taken along the line 8—8 on FIG. 3*c*.

The parts will move downwardly through the upper orienting sleeve 29 and the coupling sleeve 28, the final latch 65 engaging one tapered guide side or the other 101 or 102 of the upper orienting sleeve, which will effect a turning of the carrier barrel 38 and the cutter members suspended therefrom by means of the rods 16, until a latch 65 enters one of the grooves 100, thereby bringing the pads 12 and their rollers 16 into substantial alignment with the longitudinal guide grooves 25 in the final or lower orienting sleeve 24. Lowering of the entire mechanism on the wire line continues, the lowermost roller 18 engaging one guide side or the other 101, 102 of the lower orienting sleeve 24, which will turn it into position to align fully the lowermost bit pad 12 with one of the pad deflectors or ramps 110, which are then spring biased inwardly across the drive mandrel passage. Actually, the shifting of the final latch 65 into one of the longitudinal grooves 100 in the upper orienting sleeve 29 will have substantially aligned all of the bit pads 12 with their respective ramps 110 and slots 11. However, if there is a slight variance, then the entry of the rollers 18 into the longitudinal grooves 25 of the lower orienting sleeve 24 and the longitudinal grooves 19 of the drive mandrel 10 will insure appropriate alignment of each bit pad 12 with its ramp 110 and with a slot 11 into which it is to be expanded. If lowering of the wire line and the entire mechanism continues, the lowermost bit pad 12 will engage one of the damps 110, which will deflect its lower portion outwardly and will place its hook 142 over the annular strut portion 144 extending across its associated slot (FIG. 3*d*). Continued lowering will cause the pad follower 14 to shift outwardly, acting through the link 13 to swing the upper portion of the lowermost bit pad outwardly until the follower 14 is also disposed in the slot behind the bit pad, the lower portion 20 of the mandrel groove 19 being wider than its upper portion to permit the yoke portion 17 of the link to move into such groove.

As lowering of the wire line, core barrel apparatus and other bit parts continues, the intermediate or second pad 12 then engages a ramp 110 with which it has been aligned, and such ramp will also swing its lower portion outwardly until its hook portion 142 engages the annular strut 144 extending across its slot 11, the intermediate follower 14 then acting through the link 13 to swing the upper portion of the intermediate pad outwardly within its slot and to place its follower behind the intermediate pad. As lowering continues, the third or uppermost bit pad 12 will engage the remaining ramp 110, which will swing its lower portion outwardly to place its hook 142 over the annular strut portion 144 extending across its companion slot 11, its pad follower 14 then acting through the uppermost link 13 to swing the upper end of the bit pad outwardly, the pad follower also shifting outwardly within the slot behind the uppermost pad.

During shifting of each pad outwardly of its slot, its inner surface engages the fingers 124 of its associated ramp 110 and swings such fingers inwardly and the upper triangular portion 16 of the ramp outwardly behind the inner surface of its associated pad 12, so as to leave the passage 125 through the annular strut 115 unobstructed. The lack of obstruction is necessary to permit upward passage of the core into the inner barrel 46 as it is formed by the bit pads or cutter members 12. Lowering of the wire line and core barrel mechanism continues, the lower portion of the carrier barrel 38 moving behind the follower members 14 and the bit pads 12 until its shoulder 127 comes to rest upon the annular strut 115, as disclosed in FIG. 4*b*. The bit pads 12 are now locked in their final position within the slots 11, backed up by the pad followers or blocking elements 14, the pads 12 being snugly hooked over the annular strut portions 144 extending across the mandrel slots, and the periphery of the carrier barrel 38 bearing against the pad followers, which, in turn, bear against the inner surfaces of the pads, the upper ends 128 of the latter being held snugly against the drive mandrel defining the upper ends 129 of their slots 11. When in this position, the gasket seal 41 at the lower end of the carrier barrel engages the lower shoulders 134 of the bit pads 12. When the carrier barrel arrives in this final position, the final latch 65 is then disposed in alignment with one of the slots 64 in the upper orienting sleeve 29, the latch expanding outwardly into such slot and locking the entire mechanism in its downward position within the drive mandrel barrel 22 and drive mandrel 10.

As stated above, when the final latch snaps into its position within its companion slot, as permitted by the absence of tension on the retracting rod 68, which permits the spring 76 to shift the rod downwardly and move its retracting pins into the wide portions of the latch slots 73, the telemeter microswitch 94 is actuated by engaging the cap 77, transmitting an appropriate signal through the cable 93 to the top of the hole or drilling rig that the mechanism has been latched inits final position. The overshot 92 is then released, in any suitable manner, from the head 91 of the retracting rod, and the wire line 93 and overshot 92 pulled up through the drill string A to the drilling rig. The drilling and coring operation can now commence.

When the drilling and coring mechanism is lowered through the drill string A toward its position in the drive barrel 22 and mandrel 10, the lower end of the drive mandrel is preferably several feet off the bottom of the bore hole. When the drill bit parts have been expanded outwardly and the coring mechanism has been latched in its final position, the wire line 93 and overshot 92 having been removed, rotation of the drilling apparatus can occur either through rotating the entire string of drill pipe from the drilling rig, or through use of the drilling fluid actuated turbine (not shown) connected thereto. The drill string A is then lowered until the drill bit pads 12 engage the bottom of the hole. Appropriate drilling weight is then transmitted from the drill string through the drive mandrel barrel 22 and drive mandrel 10 directly to the cutters 12, the drilling fluid being pumped through the drill string and discharging from the lower end of the annular passage 47 between the inner and outer barrels 46, 38 into the bore hole, to carry the cuttings upwardly around the drill pads, which, it is to be noted, are extending laterally outwardly beyond the drive mandrel 10 to a significant extent, the drive mandrel itself performing no drilling action upon the formation. The cuttings produced by the diamond cutting elements 151 are conveyed by the drilling fluid upwardly around the drill bit apparatus and upwardly through the annulus around the drill pipe string A toward the drilling rig, the circulating fluid and cuttings passing upwardly through the waterways 152 and also around the diamond elements 151 themselves, as well as between the bit pads 12, the diamond cutting elements and the matrix material in which they are embedded being maintained in a clean and cool condition, for most effective penetration of the diamonds into the formation.

As drilling occurs, only the outer annular portion of the bottom of the bore hole is being drilled, forming a central core of a diameter corresponding to the diameter across the inner cylindrical surfaces 133 of the drill bit pads, this core passing relatively upwardly into the inner core barrel 46. Assuming the inner core barrel to have a length to accept a core 30 feet in diameter, when 30 feet of bore hole have been drilled or cored, rotation of the drill bit is stopped and the entire drilling string raised several feet off bottom, the core catcher 137 shifting inwardly to engage the lower portion of the core, which will break off from the bottom of the bore hole, the core catcher retaining the core within the inner barrel. The overshot 92 is then lowered through the drill string on the electric wire line 92 until it engages over the retracting rod head 91, an upward pull being taken on the wire line and retracting rod 68 to cause the retracting pins 72 to engage the cam faces 74 of the latch 65 and shift the latter inwardly, the retracting rod 68 moving upwardly and informing the operator at the top of the well bore that the latch has been retracted through operation of the telemeter microswitch 94.

As the wire line 93 is moved upwardly, its upward movement is transmitted through the retracting rod flange 78 to the cap 77 and the the latch body 43, which is connected through the adapter coupling 42 to the carrier barrel 38, shifting the carrier barrel upwardly and elevating it above the bit pads 12 and the pad followers 14. As the carrier barrel 38 moves upwardly, one of its shoulders 36 will engage the T-shaped head 35 of the shortest rod 16 and will pull such rod upwardly, such upward movement being transmitted through the cable 15 to the follower 14 connected thereto, the follower being pulled inwardly of the drive mandrel 10, and, through the connecting link 13, swinging the upper portion of its bit pad 12 inwardly, to elevate the bit pad and remove its hook 142 from the strut 144 of the drive mandrel 10, pulling the entire bit pad 12 within the drive mandrel passage.

During such upward and inward shifting of the shortest rod 16 and its attached follower 14, link 13 and bit pad 12, the intermediate and the longest rod heads 35 have not as yet been engaged by the shoulders 36 at the lower ends of the carrier barrel grooves 37. It is only after the bit pad 12 described above has been retracted fully inwardly within the drive mandrel 10 and elevated above the location of the other pad followers 14 and bit pads 12 that the T-shaped head 35 of the intermediate rod 16 will be engaged by its shoulder 36 at the lower end of the groove 37 in which it lies, exerting an upward pull on the rod 16 of intermediate length, the continued elevation of the carrier barrel 38 by the wire line 93 then pulling the intermediate pad follower 14, its link 13, and its bit pad 12 first inwardly of its slot 11 and then completely within the drive mandrel passage, the uppermost follower, link and bit pad shifting upwardly of the drive barrel ahead of the intermediate parts.

When the intermediate pad 12 has been elevated above the remaining bit pad and its follower mechanism, the T-shaped head 35 of the longest rod 16 will be engaged by the carrier barrel shoulder 36 at the end of its groove 37, which will exert an upward pull on such rod, which acts through its cable 15 to pull the remaining follower 14 inwardly, and acting through the link 13 to pull the remaining bit pad 12 inwardly of the mandrel slot 11 into the central passage of the mandrel 10. The entire mechanism has now been fully retracted. Elevation of the wire line 93 will remove the entire coring mechanism and the entire bit mechanism in tandem array through the drive barrel 22 and the drill string A to the drilling rig, where the core can be removed from the inner barrel 46 and the various bit parts inspected and replaced, if necessary.

After the empty inner core barrel 46 has again been related to the coring mechanism and the latter appropriately secured to the tandem arrangement of drill bit mechanisms, this combination can again be lowered from the drilling rig through the drill string A to the drive member 22 and the drive mandrel 10, the orienting sleeves 29, 24 again appropriately orienting the several parts so that the bit pads 12 are appropriately oriented with respect to their mandrel slots 11 and deflectors or cams 110 (which have been shifted inwardly by their respective springs 120 as a result of the previous withdrawal of the bit pads 12 from the mandrel slots). The foregoing cycle of operation is repeated to effect the progressive outward shifting of the bit pads 12, links 13 and followers 14 within the drive mandrel 10, and the final latching of the coring mechanism in position behind the bit pads and followers, the wire line mechanism being released from the head 91 of the retracting rod 68 and removed from the drill string. The apparatus is again lowered until the bit pads 12 are bearing against the bottom of the hole, and the drilling and coring operation can continue as before.

The operation of running the mechanism on a wire line through the drill string and shifting the several parts to their final position is a continuous one. Lowering of the wire line 93 proceeds without hesitation, with the final latch 65 appropriately turning the carrier barrel 38 and the bit mechanisms supported thereby in oriented relation into aligned position with the pad ramps 110 and mandrel slots 11, with the final alignment, if required, occurring automatically by virtue of the rollers 18 on the link yokes 17 engaging the guide surface 101 or 102 of the final latch sleeve 24. Lowering of the wire line, as stated above, is continuous until an appropriate signal is given at the drilling rig advising the operator that the mechanism has been latched in appropriate position. Similarly, retraction and retrieval of the mechanism from the drive mandrel 10 and drive barrel 22, and through the drill string A is a continuous operation. The engagement of the overshot 92 with the retracting plunger head 91 and partial raising of the rod 68 will provide a signal to the operator at the top of the well bore, transmitted through the electric cable, that the latch 65 has been retracted; whereupon, the wire line is moved upwardly without interruption to elevate the coring mechanism above the bit portions of the apparatus, followed by successive retraction of the sets of followers 14, links 13 and bit pads 12 from their positions within the drive mandrel slots 11, replacing them in tandem array, the elevation of the wire line continuing, to withdraw the entire mechanism through the drill pipe A to the drilling rig.

The pad followers 14 are locked in their positions behind the pads 12 by the carrier barrel 38. As a result, the horizontal, radial forces incident to drilling are transmitted from each pad directly back to the stiff carrier barrel 38, insuring the retention of each bit pad 12 in its outwardly expanded position. The downward drilling weight imposed on the bit pads 12 is transmitted directly from the drive mandrel 10 thereto, relieving the follower and link mechanisms of such load. The same is true of the drilling torque which is transmitted directly from the sides of the mandrel slots 11 to the bit pads.

The drill bit disclosed has maximum lateral stability to prevent drill collar wobble, the drill collars forming the lower portion of the drilling string A, and which are attached to the drive mandrel barrel 22 or to a turbine, if a turbine is used to supply the motive power for rotating the drill bit. Both the vertical gauge surfaces 130 and the tapered wedging surfaces 131 on the bit pads provide for such stability. The tapered drilling surfaces 131 permit appropriate sizes, numbers and patterns of diamonds 151 to be plotted, insuring the presence of appropriate diamonds to maintain a maximum drilling rate without causing the diamonds to be locally overloaded, that would result in their failure, and consequent shortening of the effective life of the drill bit pads 12 and of the drill bit itself, requiring premature retraction and removal of the parts to the drilling rig for replacement of parts. It is found that satisfactory diamond coverage is obtained, while stability is improved to prevent drill collar wobble, by making the angle of the tapered surfaces 131 of the bit pads about 70 degrees from the horizontal, and preferably greater than 70 degrees; that is to say, the tapered surfaces of the bit pads make an angle of preferably less than 30 degrees with respect to the axis of the drive mandrel 10. Despite the existence of such relatively steep taper, it is found that excessive torques are not required to rotate the bit, the angle of the cone surface 131 being a safe one.

It is found that the bit pads 12 can be made entirely of matrix material, with the diamonds 151 molded therewithin. There is no necessity for providing a steel core and bonding the matrix material thereto. In the past, the provision of a steel core has increased the chance of bond failure, since the matrix and the steel core are of basically dissimilar materials having different physical properties. The provision of an all matrix and diamond bit pad increases the strength of the parts and their reliability under high stress.

The drill bit of the type disclosed enables the bit pads 12 to be made of relatively large size for the minimum diameter passage through which they must pass, and yet permits them to drill a bore hole of a diameter which is more than twice the diameter of the minimum passage through which the bit cutter members 12 can pass. By way of example, bit pads 12 capable of passing through a minimum passage of 4 inches in diameter can be expanded outwardly of the drive mandrel 10 and locked therewithin to drill a hole of 9⅞ inches in diameter, or more than twice the diameter of the minimum passage through which the parts must pass.

When used in coring, the apparatus enables a comparatively large diameter core to be produced and recovered, which, in connection with the drilling of a 9⅞ inch hole, can be two inches in diameter.

The net result of all of the foregoing is the elimination of slow round trips with the drilling string A for the purpose of changing bits, thereby reducing considerably rig time consumed in connection with bit changes, with attendant major reductions in the cost of drilling the hole.

The invention described herein was made in the course of or under a contract from the National Science Foundation, an agency of the United States Government.

We claim:

1. In a retractable and expansible drill bit: tubular drive means attachable to the lower portion of a tubular drilling string; deflector means extending across the passage of said drive means; cutter means movable downwardly through the passage of said drive means and into engagement with said deflector means to be expanded thereby into driving relation to said tubular drive means and to a position extending laterally outwardly beyond the exterior of said drive means; and means for turning said cutter means within said drive means in response to downward movement of said cutter means in said drive means to orient said cutter means relative to said deflector means.

2. In a drill bit as defined in claim 1; and holding means in said drive means for retaining said cutter means in its outwardly expanded position.

3. In a retractable and expansible drill bit: tubular drive means attachable to the lower portion of a tubular drilling string; deflector means extending across the passage of said drive means; and cutter means movable downwardly through the passage of said drive means and into engagement with said deflector means to be expanded thereby into driving relation to said tubular drive means and to a position extending laterally outwardly beyond the exterior of said drive means; said tubular drive means having a plurality of circumferentially spaced slots; said cutter means comprising a plurality of cutter members movable in tandem through the passage of said drive means and successively into engagement with said deflector means to be deflected thereby successively laterally into said slots and into coupling relation to said drive means.

4. In a drill bit as defined in claim 3; and holding means movable downwardly in said drive means passage behind said cutter means to retain said cutter means within said slots in their outwardly expanded position.

5. In a drill bit as defined in claim 3; and orienting means for aligning said cutter means with said slots to insure their outward deflection thereinto.

6. In a drill bit as defined in claim 3; orienting means for aligning said cutter means with said slots to insure their outward deflection thereinto; and holding means movable downwardly in said drive means passage behind said cutter means to retain said cutter means within said slots in their outwardly expanded position.

7. In a retractable and expansible drill bit: tubular drive means attachable to the lower portion of a tubular drilling string; deflector means extending across the passage of said drive means; and cutter means movable downwardly through the passage of said drive means and into engagement with said deflector means to be expanded thereby into driving relation to said tubular drive means and to a position extending laterally outwardly beyond the exterior of said drive means; said tubular drive means having a plurality of circumferentially spaced slots; said cutter means comprising a plurality of cutter members movable in tandem through said drive means passage and successively into engagement with said deflector means whereby the lower portions of said cutter members are deflected successively into said slots, said cutter means further comprising follower members connected to the upper portions of said cutter members to shift said upper portions into said slots and said cutter members into coupling relation to said drive means.

8. In a drill bit as defined in claim 7; and holding means movable downwardly of said drive means passage behind said follower members to retain said cutter members within said slots in their outwardly expanded position.

9. In a retractable and expansible drill bit: tubular drive means attachable to the lower portion of a tubular drilling string; deflector means extending across the passage of said drive means; and cutter means movable downwardly through the passage of said drive means and into engagement with said deflector means to be expanded thereby into driving relation to said tubular drive means and to a position extending laterally outwardly beyond the exterior of said drive means; means mounting said deflector means on said drive means for shifting from its position across said drive means passage.

10. In a retractable and expansible drill bit: tubular drive means attachable to the lower portion of a tubular drilling string, said tubular drive means having a plurality of circumferentially spaced slots; deflector means carried by said drive means adjacent said slots and extending across the passage of said drive means; carrier means adapted to be lowered and elevated through the drilling string on a wire line; cutter means carried by said carrier means and comprising a plurality of cutter members movable in tandem through the drilling string and drive means passage and successively into engagement with said deflector means to be expanded thereby successively laterally into said slots to extend beyond said drive means in coupling relation to said drive means; said carrier means being movable downwardly in said drive means passage behind said cutter means to retain said cutter members in coupling relation to said drive means.

11. In a drill bit as defined in claim 10; and orienting means within said drive means for aligning said cutter members with said slots to insure their outward expansion thereinto.

12. In a drill bit as defined in claim 10; and orienting means within said drive means engageable with said carrier means for aligning said cutter members with said slots to insure their outward expansion thereinto.

13. In a drill bit as defined in claim 10; said cutter means further comprising follower members connected to said cutter members to shift said cutter members into coupling relation to said drive means; said carrier means moving behind said follower members to hold said follower members against said cutter members and said cutter members in coupling relation to said drive means.

14. In a drill bit as defined in claim 10; said cutter means further comprising follower members connected to said cutter members to shift said cutter members into coupling relation to said drive means; said carrier means moving behind said follower members to hold said follower members against said cutter members and said cutter members in coupling relation to said drive means; and orienting means within said drive means engageable with said carrier means for aligning said cutter members and follower members with said slots to insure their outward expansion thereinto.

15. In a drill bit as defined in claim 10; means mounting said deflector means in said drive means for shifting from its position across said drive means passage.

16. In a drill bit as defined in claim 10; means mounting said deflector means in said drive means for shifting from its position across said drive means passage; said cutter members being adapted to cut a central core in a formation being drilled; said carrier means including core barrel means for receiving the core produced by said cutter members.

17. In a drill bit as defined in claim 10; said deflector means comprising a pad for each slot engageable by a cutter member to shift said cutter member into said slot; means mounting said pads for lateral shifting from their position across said drive means passage; said cutter members engaging said pads to shift said pads from said drive means passage as said cutter members move outwardly within said slots, said cutter members being adapted to cut a central core in a formation being drilled; said carrier means including core barrel means for receiving the core produced by said cutter members.

18. In a drill bit as defined in claim 10; said deflector means comprising a pad for each slot engageable by a cutter member to shift said cutter member into said slot; means mounting said pads for lateral shifting from their position across said drive means passage; said cutter members engaging said pads to shift said pads from said drive means passage as said cutter members move outwardly within said slots, said cutter members being adapted to cut a central core in a formation being drilled; said carrier means including core barrel means for receiving the core produced by said cutter members; said cutter means further comprising follower members connected to the upper portions of said cutter members to shift said upper portions into said slots and said cutter members into coupling relation to said drive means.

19. In a drill bit as defined in claim 10; said deflector means comprising a pad for each slot engageable by a cutter member to shift said cutter member into said slot; means mounting said pads for lateral shifting from their position across said drive means passage; said cutter members engaging said pads to shift said pads from said drive means passage as said cutter members move outwardly within said slots, said cutter members being adapted to cut a central core in a formation being drilled; said carrier means including core barrel means for receiving the core produced by said cutter members; said cutter means further comprising follower members connected to the upper portions of said cutter members to shift said upper portions into said slots and said cutter members into coupling relation to said drive means; and orienting means within said drive means engageable with said carrier means for aligning said cutter members with said slots to insure their outward expansion thereinto.

20. In a drill bit as defined in claim 10; said deflector means comprising a pad for each slot and engageable by a cutter member to shift said cutter member into said slot; means mounting said pads for lateral shifting from their position across said drive means passage; said cutter members engaging said pads to shift said pads from said drive means passage as said cutter members move outwardly within said slots; said cutter members being adapted to cut a central core in a formation being drilled; said carrier means including core barrel means for receiving the core produced by said cutter members; each of said cutter members when coupled to said drive means having an upper gauge face parallel to the axis of said drive means, a lower end face, and a downwardly tapering face between said gauge face and end face, said tapering face being inclined to the axis of said drive means at an angle not exceeding about 30 degrees, each of said cutter members further having an inner face parallel to the axis of said drive means and extending upwardly from said end face, and diamond cutting elements in said end, inner and tapering faces.

21. In a drill bit as defined in claim 10; said deflector means comprising a pad for each slot and engageable by a cutter member to shift said cutter member into said slot; means mounting said pads for lateral shifting from their position across said drive means passage; said cutter members engaging said pads to shift said pads from said drive means passage as said cutter member move outwardly within said slots, said cutter members being adapted to cut a central core in a formation being drilled; said carrier means including core barrel means for receiving the core produced by said cutter members; each of said cutter members when coupled to said drive means having an upper gauge face parallel to the axis of said drive means, a lower end face, and a downwardly tapering face between said gauge face and end face, said tapering face being inclined to the axis of said drive means at an angle not exceeding about 30 degrees, each of said cutter members further having an inner face parallel to the axis of said drive means and extending upwardly from said end face; and diamond cutting elements in said end, inner and tapering faces; and orienting means within said drive means engageable with said carrier means for aligning said cutter members with said slots to insure their outward expansion thereinto.

22. In a drill bit as defined in claim 10; said deflector means comprising a pad for each slot and engageable by a cutter member to shift said cutter member into said slot; means mounting said pads for lateral shifting from their position across said drive means passage; said cutter members engaging said pads to shift said pads from said drive means passage as said cutter members move outwardly within said slots, said cutter members being adapted to cut a central core in a formation being drilled; said carrier means including core barrel means for receiving the core produced by said cutter members; each of said cutter members when coupled to said drive means having an upper gauge face parallel to the axis of said drive means, a lower end face, and a downwardly tapering face between said gauge face and end face, said tapering face being inclined to the axis of said drive means at an angle not exceeding about 30 degrees, each of said cutter members further having an inner face parallel to the axis of said drive means and extending upwardly from said end face, and diamond cutting elements in said end, inner and tapering faces; orienting means within said drive means engageable with said carrier means for aligning said cutter members with said slots to insure their outward expansion thereinto; said cutter means further comprising follower members connected to the upper portions of said cutter members to shift said upper portions into said slots and said cutter members into coupling relation to said drive means.

23. In a retractable and expansible drill bit; tubular drive means attachable to the lower portion of a tubular drilling string; deflector means extending across the passage of said drive means; and cutter means movable downwardly through the passage of said drive means and into engagement with said deflector means to be expanded thereby into driving relation to said tubular drive means and to a position extending laterally outwardly beyond the exterior of said drive means; said tubular drive means having a plurality of circumferentially spaced slots; said cutter means comprising a plurality of cutter pads movable in tandem through the pasage of said drive means and successively into engagement with said deflector means to be deflected thereby successively laterally into said slots and into coupling relation to said drive means; each of said pads when coupled to said drive means having an upper gauge face parallel to the axis of said drive means, a lower end face, and a downwardly tapering face between said gauge face and end face, said tapering face being inclined to the axis of said drive means at an angle not exceeding about 30 degrees, and diamond cutting elements in said end and tapering faces.

24. In a retractable and expansible drill bit: tubular drive means attachable to the lower portion of a tubular drilling string; deflector means extending across the passage of said drive means; and cutter means movable downwardly through the passage of said drive means and into engagement with said deflector means to be expanded thereby into driving relation to said tubular drive means and to a position extending laterally outwardly beyond the exterior of said drive means; each of said cutter members when coupled to said drive means having an upper gauge face parallel to the axis of said drive means, a lower end face, and a downwardly tapering face between said gauge face and end face, said tapering face being inclined to the axis of said drive means at an angle not exceeding about 30 degrees, and diamond cutting elements embedded in said end and tapering faces.

References Cited

UNITED STATES PATENTS

| | | | |
|---|---|---|---|
| 1,171,790 | 2/1916 | Humason | 175—260 |
| 1,836,703 | 12/1931 | Christensen | 175—260 |
| 2,068,704 | 1/1937 | Powell | 175—259 |
| 2,208,457 | 7/1940 | Hurley | 175—259 |
| 2,375,335 | 5/1945 | Walker | 175—259 |
| 2,510,386 | 6/1950 | Denning et al. | 175—257 X |
| 3,360,059 | 12/1967 | Gaylord | 175—259 |

CHARLES E. O'CONNELL, *Primary Examiner.*

R. E. FAVREAU, *Assistant Examiner.*